(12) United States Patent
Li

(10) Patent No.: US 12,017,730 B2
(45) Date of Patent: Jun. 25, 2024

(54) BICYCLE CASSETTE WITH INCREASED TOOTH RATIO

(71) Applicant: Yuan-Shun Li, Taichung (TW)

(72) Inventor: Yuan-Shun Li, Taichung (TW)

( * ) Notice: Subject to any disclaimer, the term of this patent is extended or adjusted under 35 U.S.C. 154(b) by 153 days.

(21) Appl. No.: 17/734,013

(22) Filed: Apr. 30, 2022

(65) Prior Publication Data

US 2022/0258833 A1    Aug. 18, 2022

Related U.S. Application Data

(63) Continuation-in-part of application No. 16/699,653, filed on Dec. 1, 2019, now abandoned.

(30) Foreign Application Priority Data

Oct. 17, 2019   (TW) .................................. 108213721

(51) Int. Cl.
     *B62M 9/121*   (2010.01)
(52) U.S. Cl.
     CPC .................................. *B62M 9/121* (2013.01)
(58) Field of Classification Search
     CPC ..................................................... B62M 9/121
     USPC ........................................................ 474/160
     See application file for complete search history.

(56) References Cited

U.S. PATENT DOCUMENTS

| 9,868,491 | B1 * | 1/2018 | Oishi ..................... B62M 9/10 |
| 2016/0362159 | A1 * | 12/2016 | Braedt ................. F16H 55/30 |
| 2017/0369124 | A1 * | 12/2017 | Kamada ............... F16H 55/30 |
| 2018/0345723 | A1 * | 12/2018 | Fujita ................... B60B 27/023 |

FOREIGN PATENT DOCUMENTS

| DE | 102017005826 A1 * | 1/2018 | ............... B62M 9/10 |
| DE | 102018118998 A1 * | 2/2019 | ......... B60B 27/0026 |
| DE | 102020213391 A1 * | 6/2021 | ............... B62M 9/10 |

* cited by examiner

*Primary Examiner* — Gene O Crawford
*Assistant Examiner* — Emily R Kincaid
(74) *Attorney, Agent, or Firm* — PAI PATENT & TRADEMARK LAW FIRM; Chao-Chang David Pai

(57) ABSTRACT

A bicycle cassette with increased tooth ratio includes a driver body connected to a bicycle rear hub, and multiple cogs which are sequentially mounted to the driver body with equal spacing. An additional cog is mounted to the driver body and located opposite to the rear hub. The additional cog has 8-10 teeth. The tooth ratio is increased by the additional cog and the chainring to break through the limitation of tooth ratio of existing bicycle cassettes, and to increase the number of the gears of the bicycle cassette.

1 Claim, 20 Drawing Sheets

BICYCLE CASSETTE WITH INCREASED TOOTH RATIO

The present application is a Continuation-In-Part (CIP) of U.S. patent application Ser. No. 16/699,653 entitled "Bicycle Cassette with Increased Tooth Ratio" filed Dec. 1, 2019.

BACKGROUND OF THE INVENTION

1. Field of the Invention

2. Description of the Related Art

The conventional bicycle rear cassette generally includes a driver body which is integrally formed with the rear hub, and multiple cogs mounted to the driver body with a spacer located between each two adjacent cogs so that theses cogs are evenly spaced from each other. These cogs are mounted to the driver body in tooth-number sequence. The inner periphery of the driver body is coupled with the axle of the rear hub and the bearings, so that the minimum diameter and the maximum diameter of the driver body has to be maintained. The shape and size of the cogs of the cassette have a specific regulation. The inner diameter of the cassette is limited by the minimum diameter of the driver body, so that the smallest cog of the cassette is restricted as well. In the current bicycle industry, the minimum number of the teeth of the cogs is 11 which becomes the extreme number of the teeth for the cassette.

Take the road bicycles with an eighteen-gear derailleur system as an example, the system includes a 50/34 T compact crankset, and the rear cassette has 11-23 teeth. The tooth ratio is illustrated as follows:

|           | CASSETTES |      |      |      |      |      |      |      |      |
|-----------|-----------|------|------|------|------|------|------|------|------|
| CHAINRING | 11        | 12   | 13   | 14   | 15   | 17   | 19   | 21   | 23   |
| 50        | 4.55      | 4.17 | 3.85 | 3.57 | 3.33 | 2.94 | 2.63 | 2.38 | 2.17 |
| 34        | 3.09      | 2.83 | 2.62 | 2.43 | 2.27 | 2.00 | 1.79 | 1.62 | 1.48 |

The tooth ratio is related with the revolutions per minute of the pedal that the user operates. A larger tooth ratio can drive the bicycle at a higher speed for the same number of revolutions per minute of the pedal that the user operates. With a larger tooth ratio, the user needs to have stronger muscles, and has less cardiopulmonary burden. On the contrary, a smaller tooth ratio requires a higher number of revolutions per minute of the pedal that the user operates. With a smaller tooth ratio, the user does not require as strong muscles and, however, has more cardiopulmonary burden.

If the tooth ratio is to be changed, the change of the chainring is related to Bolt Circle Diameter (BCD). The crank may need to be replaced if the BCD does not fit, and this leads to higher expenses. The mainstream of the popular chainrings is 50/34 T or 52/36 T, while 53/39 T is barely used.

US2017/0369124A1 (US124 hereinafter) discloses a bicycle rear sprocket assembly with a wide range tooth ratio. FIGS. 1 to 3 are used to disclose the second sprocket, the first sprocket and the lock member.

The specific characters of the US124 are:

(1) The bicycle rear sprocket assembly 1000 includes the first sprocket 1200 and the lock member 2600. The first sprocket 1200 includes the first opening 2400, and the first torque-transmitting structure 1800. The first opening 2400 has the first diameter D100 that is smaller than the radially outer diameter D000 of the sprocket support portion 400. The first torque-transmitting structure 1800 is provided to the first bicycle inbound facing surface 1400 and configured to transmit pedaling torque to the second sprocket 3800. It is possible to mount the first sprocket 1200, which is a radially small sprocket having less than or equal to ten teeth, to the bicycle rear hub assembly with the lock member 2600. Therefore, a bicycle to which the bicycle rear sprocket assembly 1000 is mounted can have a wide range of gear ratio.

(2) The first sprocket 1200 has the first total tooth number that is equal to or smaller than ten.

(3) The second sprocket 3800 includes the second bicycle inbound facing surface 4000, the second torque-transmitting structure 4400, and the third torque-transmitting structure 4600. The second torque-transmitting structure 4400 is provided to the second bicycle inbound facing surface 4000. The third torque-transmitting structure 4600 is configured to engage with the first torque-transmitting structure 1800 in the state where the bicycle rear sprocket assembly 1000 is mounted to the bicycle rear hub assembly.

(4) The second sprocket 3800 has the second total tooth number that is larger than the first total tooth number. Specifically, the first total tooth number is equal to or smaller than ten and the second total tooth number is eleven or more than eleven.

(5) The second torque-transmitting structure 4400 is configured to engage with the torque-transmitting structure 400s provided to the sprocket support portion 400 of the bicycle rear hub assembly 1000 in the state where the bicycle rear sprocket assembly 1000 is mounted to the bicycle rear hub assembly 1000.

(6) The second torque-transmitting structure 4400 includes a plurality of second splines 4400s.

The shortcomings of the second sprocket 3800 of the US124 are:

A separation ring 3801 is located between the second torque-transmitting structure 4400 and the third torque-transmitting structure 4600. The separation ring 3801 includes an opening 3802 which has a diameter D400. The diameter D400 is equal to the diameter D100 of the first opening 2400 of the first sprocket 1200. The second torque-transmitting structure 4400 is engaged with the torque-transmitting structure 400s of the sprocket support portion 400. The third torque-transmitting structure 4600 is configured to engage with the first torque-transmitting structure 1800. The separation ring 3801 is located between the first torque-transmitting structure 1800 and the sprocket support portion 400. Obviously, the separation ring 3801 occupies the connection area between the second torque-transmitting structure 4400 and the torque-transmitting structure 400s. The separation ring 3801 also occupies the connection area between the third torque-transmitting structure 4600 and the first torque-transmitting structure 1800. This results in unstable connection between the second sprocket 3800, the sprocket support portion 400 and the first sprocket 1200.

US124 adopts the following three options to improve the unstable connection problem and to meet the regulation regarding the gap between sprockets.

(1) The second sprocket 3800 includes a protrusion 5000 to increase the connection area between the second torque-transmitting structure 4400 and the torque-transmitting structure 400s.

(2) The third sprocket 5200 includes a stepped recess 5400 formed to the surface 5800 of the third sprocket 5200. The recess 5400 accommodates the protrusion 5000.

(3) The depth of the third torque-transmitting structure 4600 is increased to increase the connection area between the third torque-transmitting structure 4600 and the first torque-transmitting structure 1800.

However, the above mentioned options increase the manufacturing cost due to difficult machining the metal-made torque-transmitting structures 4400, 4600s.

The present invention is intended to change the minimum number of teeth of the smallest cog so as to increase the tooth ratio and keeping it compatible with the existing chainrings.

SUMMARY OF THE INVENTION

The present invention relates to a bicycle derailleur cassette with increased tooth ratio, which comprises a driver body connected to a rear hub. Multiple cogs are sequentially mounted to the driver body with equal spacing. The least number of the teeth among the cassette is eleven. An additional cog is mounted to the driver body and located opposite to the rear hub. The additional cog has 8-10 teeth.

The functions of the technical character of the present invention are that:

The advantages of the present invention are that the present invention adds an additional cog to the existing bicycle cassette and the added cog has a teeth number less than eleven, preferably 10. The tooth ratio is increased by the additional cog and the chainring to break through the limitation of tooth ratio of existing bicycle and to increase the gears of the bicycle cassette.

The additional cog is compatible with the existing driver body so that no change is needed of the existing driver body.

The additional cog is connected to the driver body and spaced from the next cog so that the chain is able to smoothly switch between the cogs.

The second technical characters of the present invention are that:

A bicycle derailleur cassette with increased tooth ratio comprises a driver body connected to a rear hub of a bicycle. A plurality of cogs are sequentially mounted to the driver body with equal spacing. The plurality of cogs include a second cog. The driver body has a first end and a second end opposite to the first end. The first end of the driver body is connected to the rear hub. A first cog is mounted to the second end of the driver body. A threaded ring is located in the second end of the driver body. An additional cog has at least one tooth less than the number of teeth of the first cog. The additional cog has an annular lip extending axially from the rear end thereof. Multiple second protrusions and multiple second recesses are axially and alternatively formed in the annular lip. A ring-shaped cap has a tubular portion extending axially therefrom. The tubular portion extends through the additional cog and is fixed to the threaded ring. The ring-shaped cap is located at one side of the additional cog. The first cog includes:

multiple cog teeth, a sprocket, a flange, multiple engaging portions, multiple first protrusions and multiple first recesses.

The total number of the multiple cog teeth is eleven or more than eleven.

The sprocket includes an inside that faces the axial center axis of rear hub, and an outside is located opposite to the inside. The inside of the sprocket forms the flange in the axial direction. The flange forms the multiple engaging portions facing the driver body. The outside of the sprocket forms the first protrusions and the first recesses facing the driver body.

The engaging portions include a first axial length formed axially of the engaging portion. The engaging portions are connected to multiple keys of the driver body.

The first protrusions and the first recesses include a second axial length formed axially thereof. The second axial length is equal to a difference of the axial length of sprocket and the first axial length. The multiple first protrusions and the first recesses are engaged with the second recesses and the second protrusions of the additional cog.

The functions of the second technical characters of the present invention are that:

The axial length of the sprocket is fully used for the connection between the driver body and the additional cog. Under the restrictions of the sprocket pitch and the thickness of the cogs, the present invention provides the maximum connection area between the first cog and the driver body and the additional cog.

The third technical characters of the present invention are that:

The axial length of the flange is equal to the sprocket pitch between the first cog and the second cog. The flange contacts the second cog.

The functions of the third technical characters of the present invention are that:

When the first cog is engaged with the driver body, the sprocket pitch between the first cog and the second cog meets the regulation.

The fourth technical characters of the present invention are that:

The first cog includes a contact face. The contact face is located at a conjunction area between the engaging portions and the first recesses and the first protrusions. The contact face contacts the second end of the driver body.

The functions of the fourth technical characters of the present invention are that:

The center axis of the first cog is perpendicular to the axis of the sprocket assembly.

The fifth technical characters of the present invention are that:

The second protrusions of the additional cog contact the end face of the threaded ring.

The functions of the fifth technical characters of the present invention are that:

The center axis of the additional cog is perpendicular to the axis of the sprocket assembly. The sprocket pitch between the additional cog and the first cog meets the regulation.

The present invention will become more obvious from the following description when taken in conjunction with the accompanying drawings which show, for purposes of illustration only, a preferred embodiment in accordance with the present invention.

DETAILED DESCRIPTION OF THE PREFERRED EMBODIMENT

Figure 1:
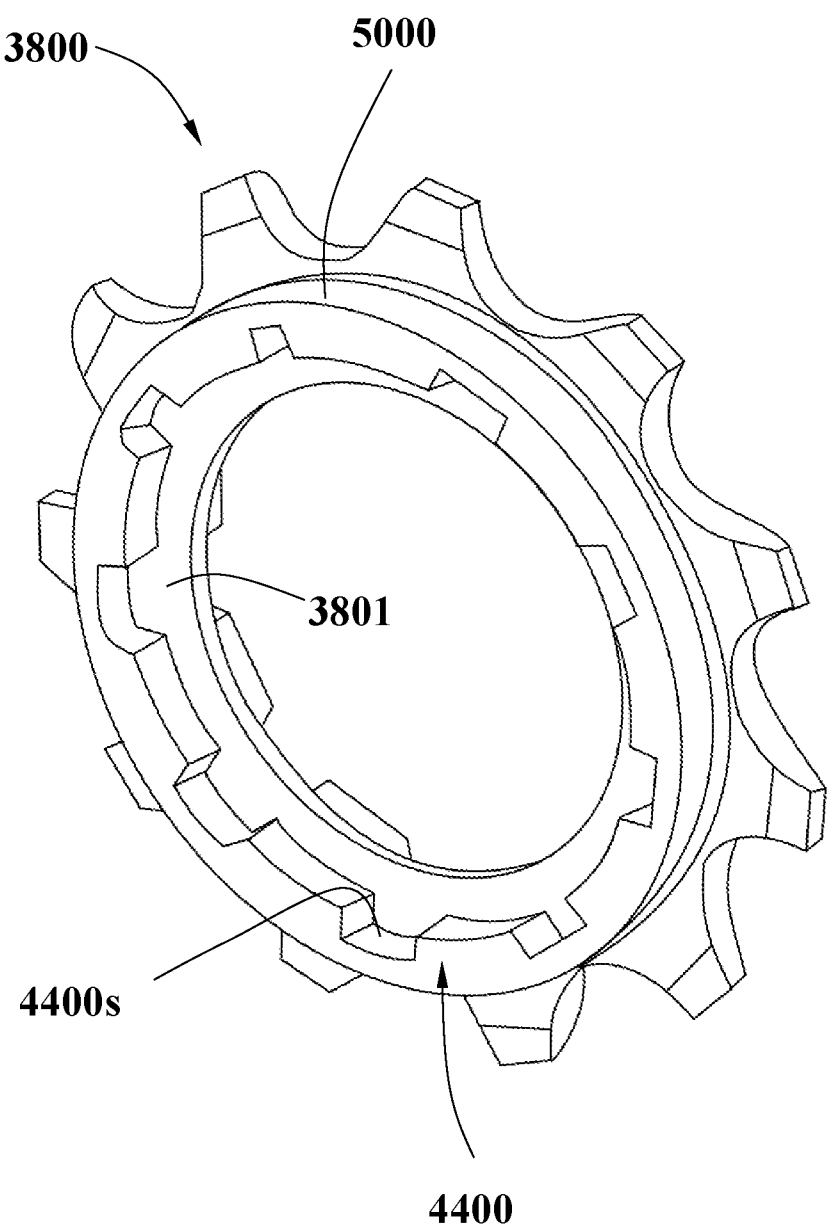
FIG. 1 is an exploded rear-end view of the second sprocket of US 2017/0369124 (US 124)
Figure 2:
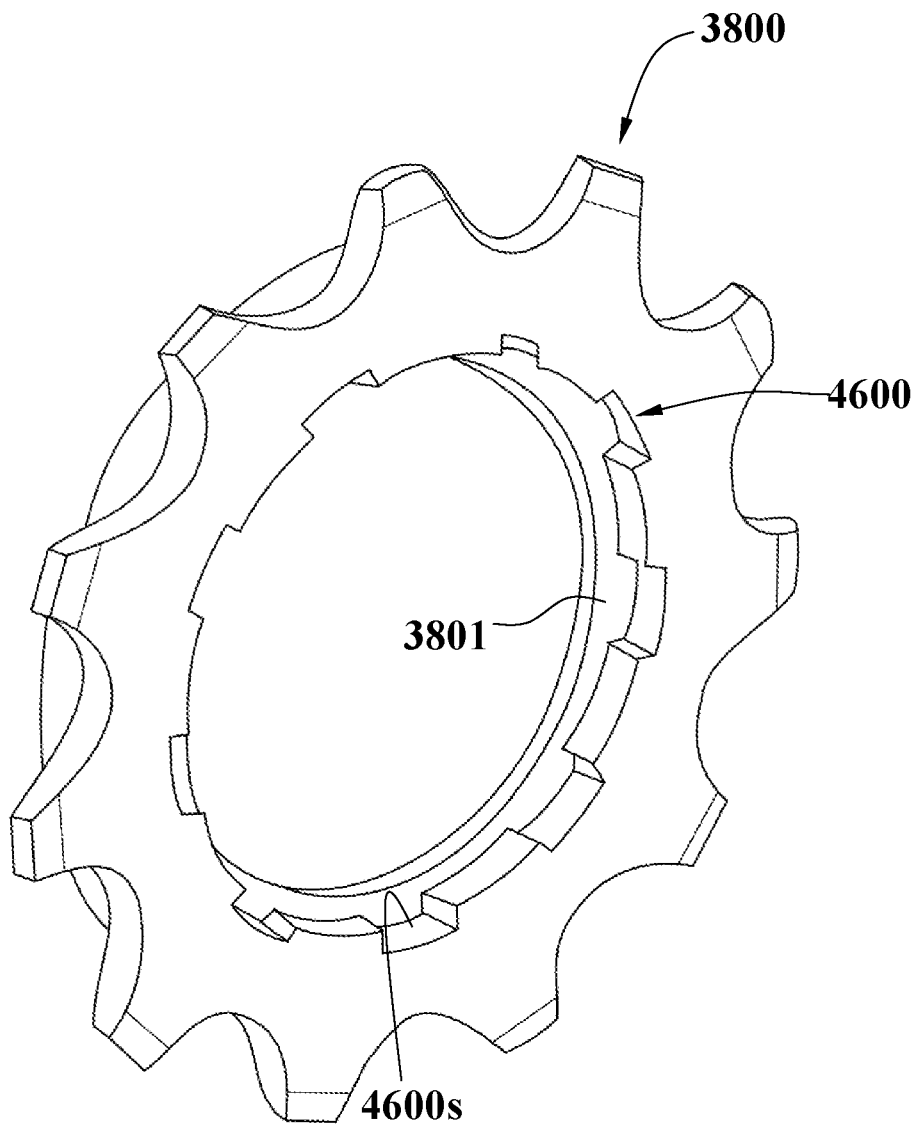
FIG. 2 is an exploded front-end view of the second sprocket of US 2017/0369124 (US 124)
Figure 3:
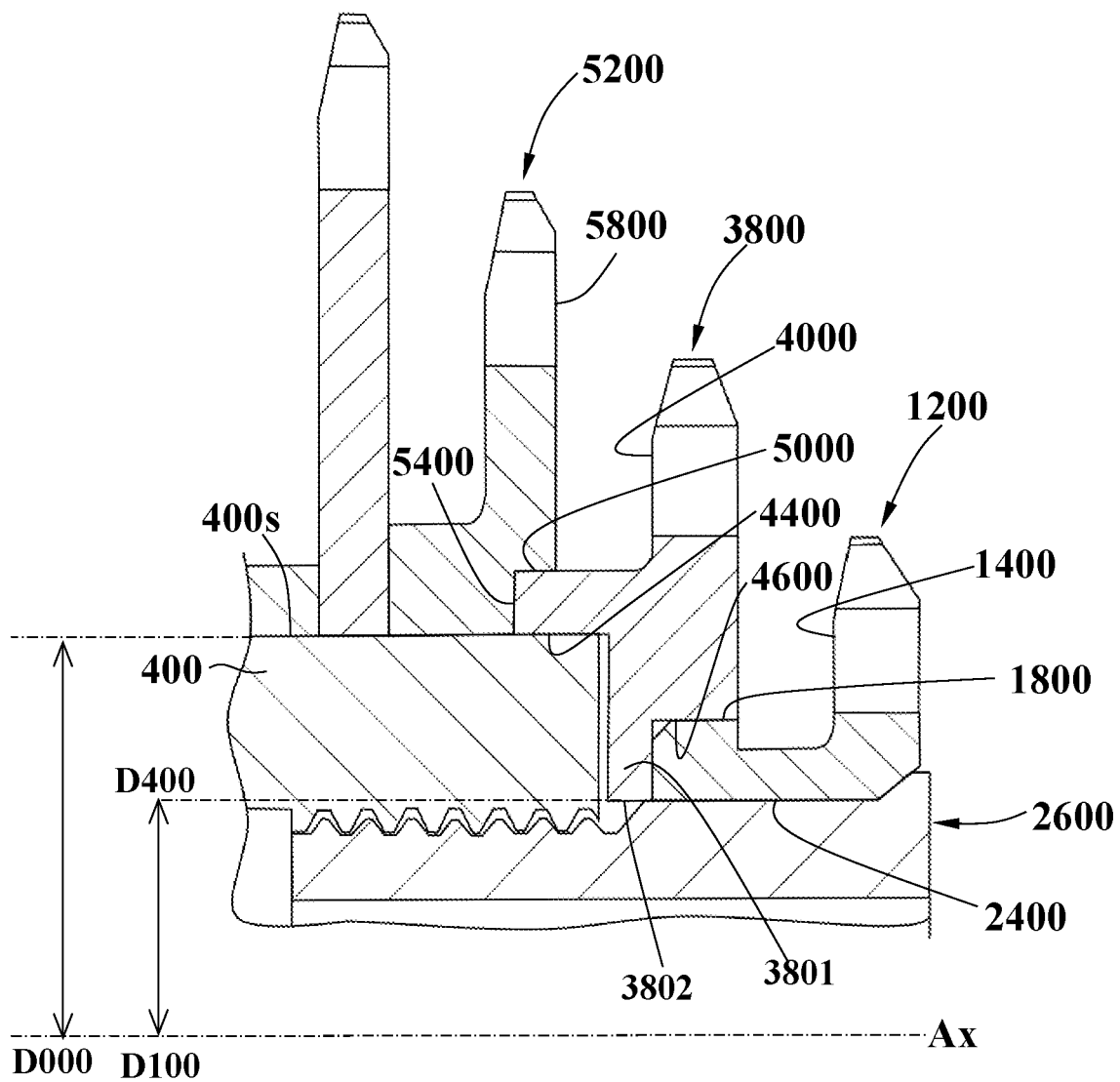
FIG. 3 is a cross sectional view of the first, second and third sprockets of US2017/0369124 (US 124)
Figure 4:
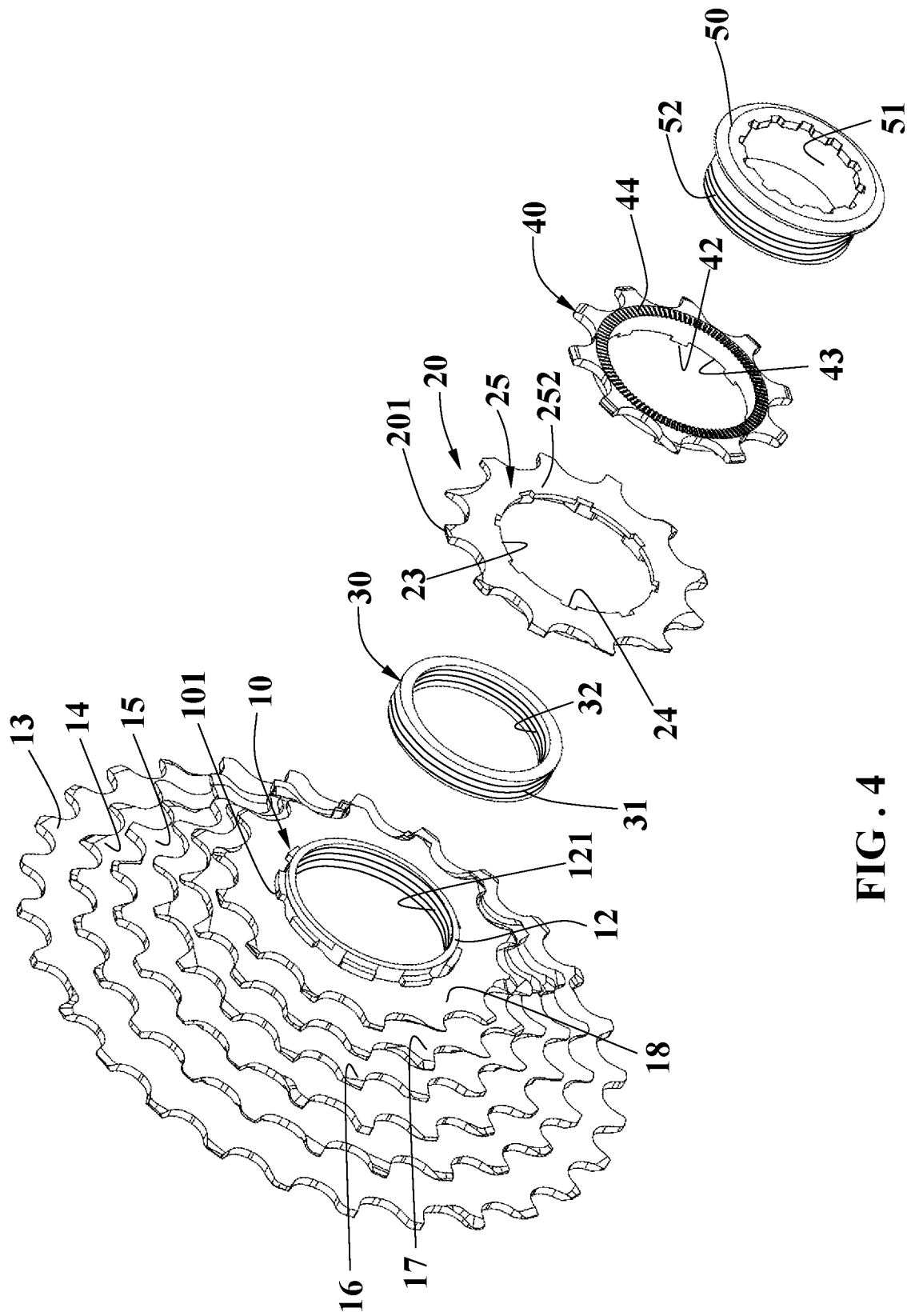
FIG. 4 is an exploded view of the bicycle cassette of the present invention, as viewed from the front end thereof.
Figure 5:
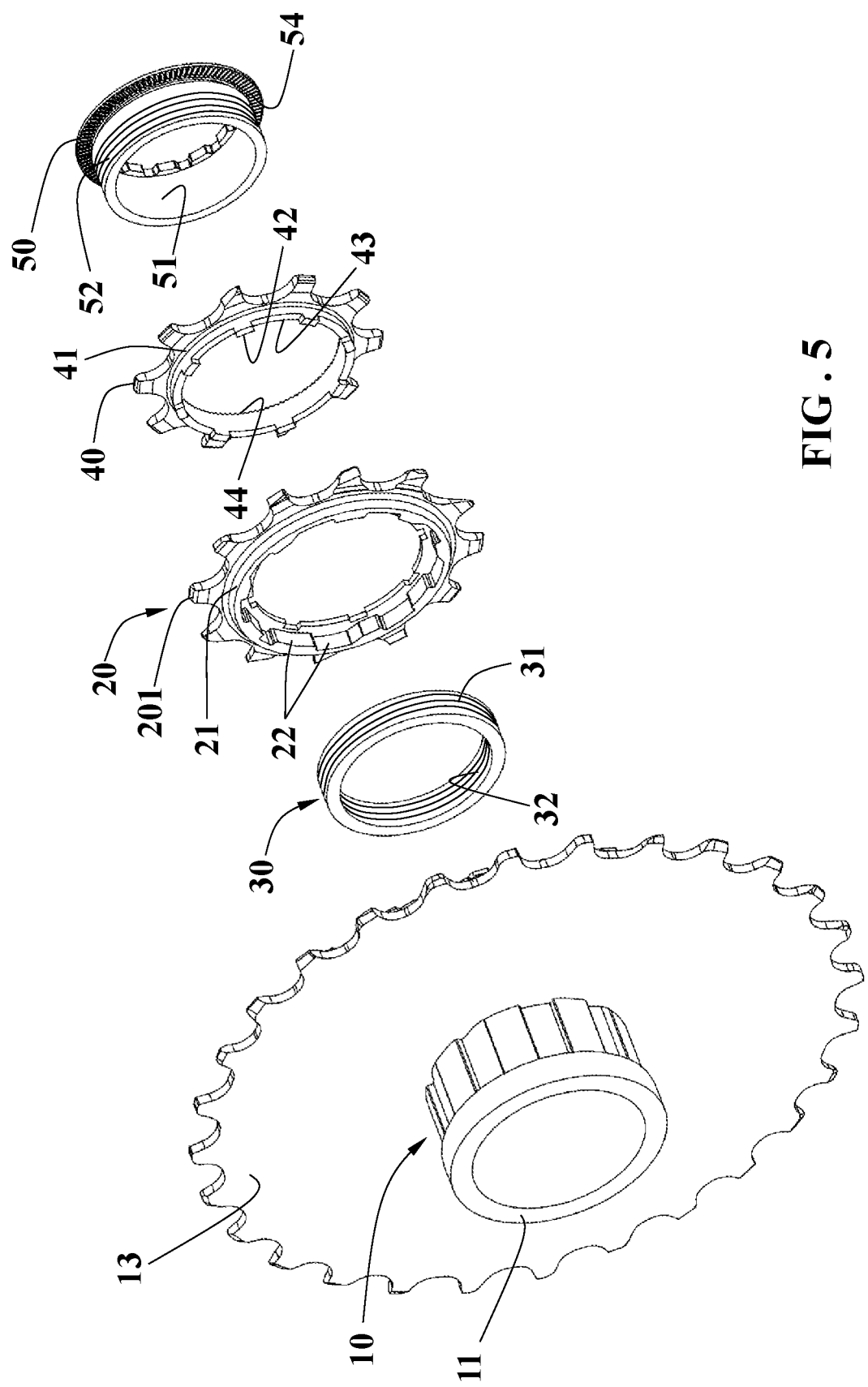
FIG. 5 is another exploded view of the bicycle cassette of the present invention, as viewed from the rear end thereof.

Referring to FIGS. 4 and 5, the bicycle cassette of the present invention comprises a driver body 10 having a first end 11 and a second end 12 located opposite to the first end 11. The first end 11 of the driver body 10 is connected to the rear hub (not shown). An additional cog 40 having ten teeth is connected to the second end 12 of the driver body 10. Multiple cogs 13-18 (i.e. 13, 14, 15, 16, 17 and 18) are sequentially mounted to the driver body 10 with equal spacing in order of increasing number of teeth from the second end 12 towards the first end 11. The inside of the driver body 10 is well known in the art and will not be described here.

The bicycle cassette of the present invention achieves an increased tooth ratio compared to conventional bicycle cassette.

The driver body 10 comprises a first threaded portion 121 defined in the inner periphery of the second end 12 of the driver body 10.

A threaded ring 30 has a second threaded portion 31 defined in the outer periphery thereof, and the first threaded portion 121 is threadedly connected to the second threaded portion 31 of the threaded ring 30 to connect the threaded ring 30 to the inner periphery of the second end 12 of the driver body 10. The threaded ring 30 includes a third threaded portion 32 defined in the inner periphery thereof. The threaded ring 30 is used to reduce the inner diameter of the driver body 10.

Figure 6:
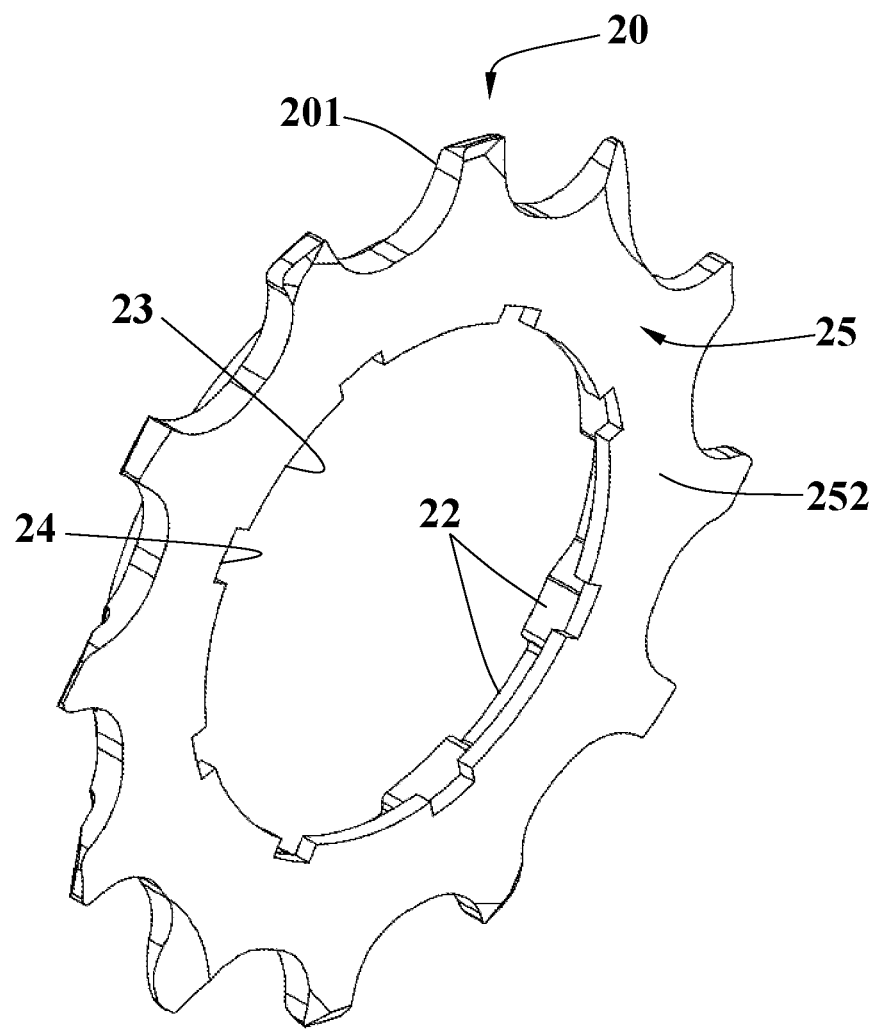
FIG. 6 is a front perspective view of the first cog of the bicycle cassette of the present invention.
Figure 7:
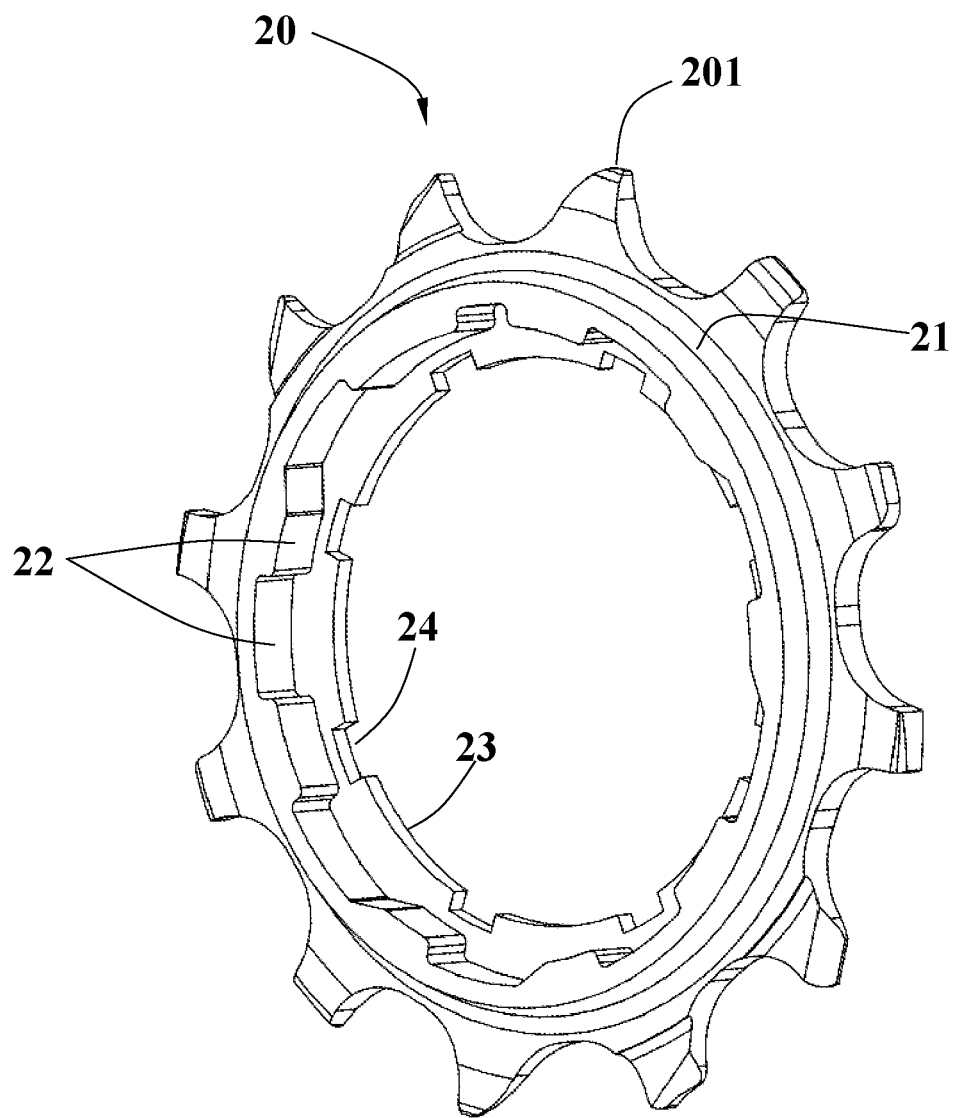
FIG. 7 is a rear perspective view of the first cog of the bicycle cassette of the present invention.

As shown in FIGS. 6 and 7, a first cog 20 has eleven or more than eleven teeth and includes an annular flange 21 extending from the rear end thereof. The flange 21 includes an engaging portion 22 in the form of ridge-recess defined in the inner periphery thereof so as to be engaged with the outer periphery of the driver body 10. The flange 21 is connected to the outer periphery of the second end 12 of the driver body 10. Multiple first protrusions 23 and multiple first recesses 24 are radially and alternatively formed in the inner periphery of the first cog 20. The first protrusions 23 contact the second end 12 of the driver boy 10 and the outer face of the threaded ring 30.

Figure 8:
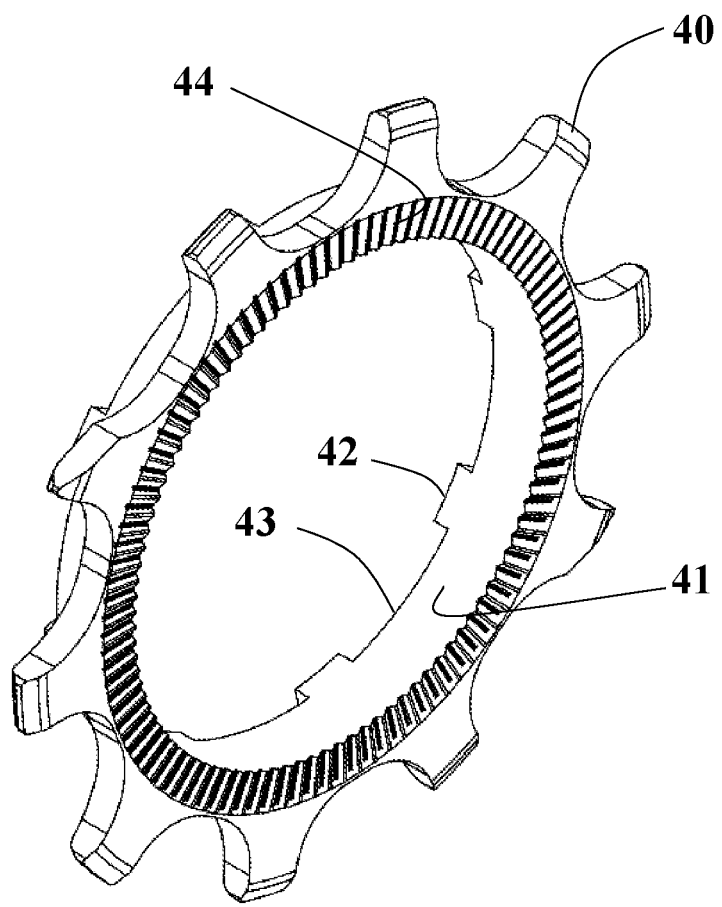
FIG. 8 is a front perspective view of the additional cog of the bicycle cassette of the present invention.
Figure 9:
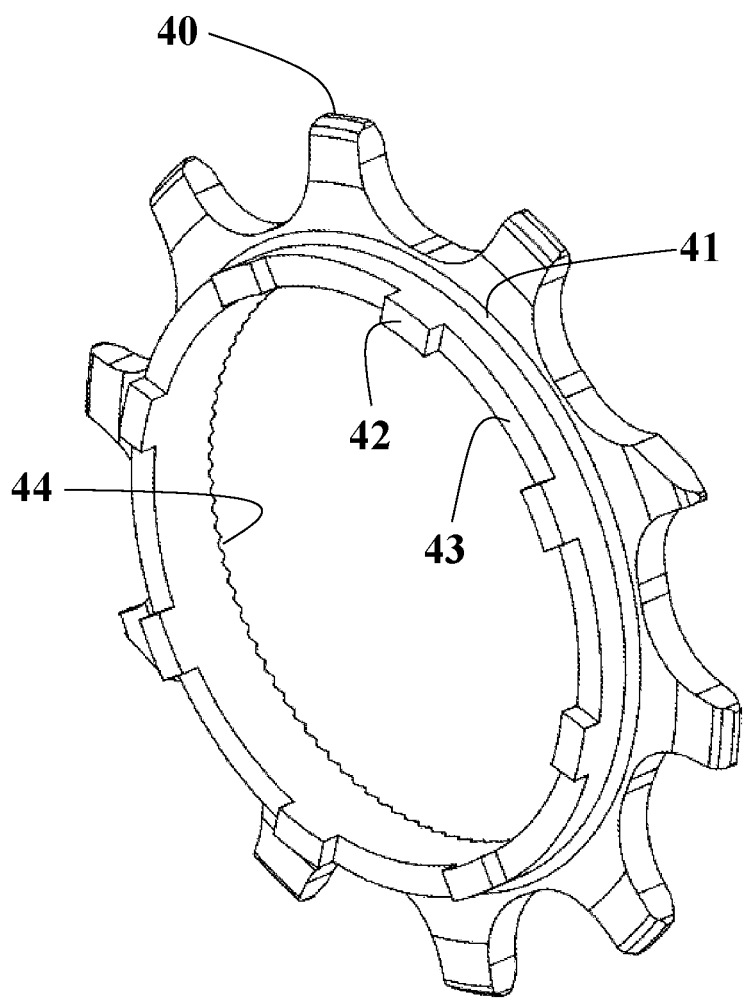
FIG. 9 is a rear perspective view of the additional cog of the bicycle cassette of the present invention.
Figure 10:
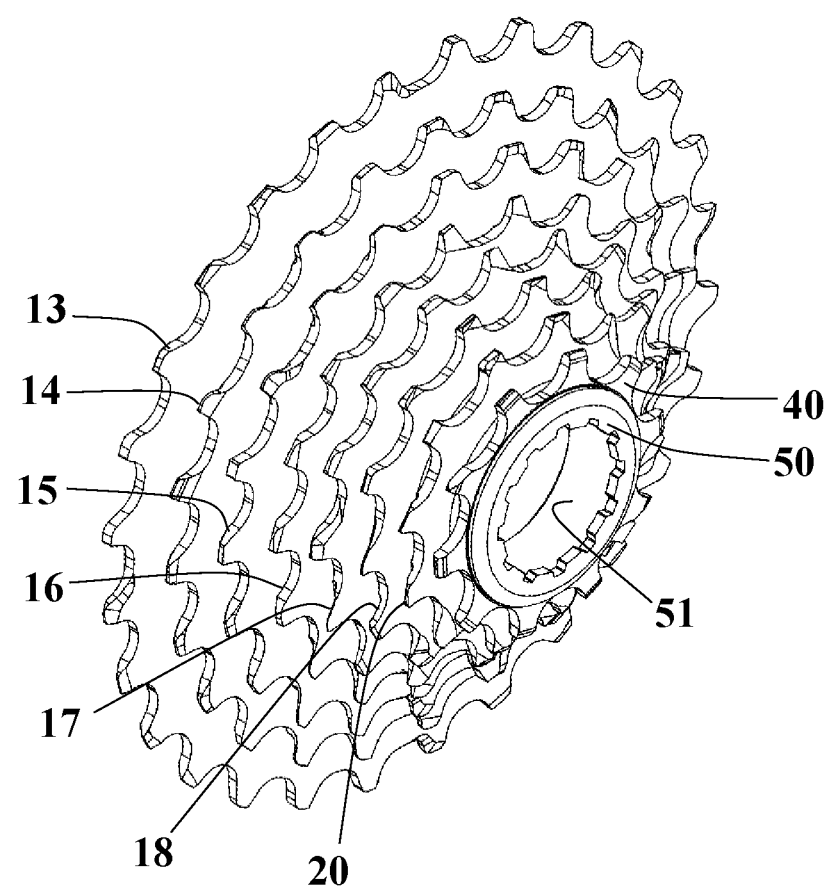
FIG. 10 is a front perspective view of the bicycle cassette of the present invention.
Figure 11:
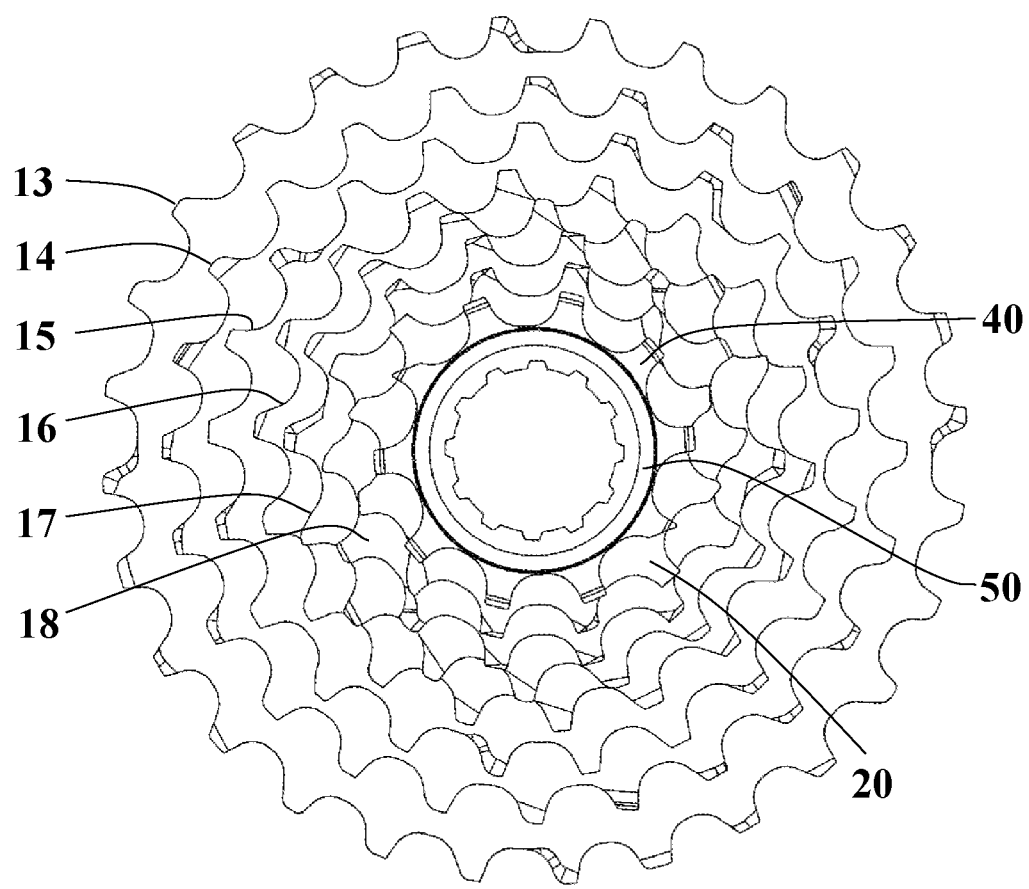
FIG. 11 is a front view of the bicycle cassette of the present invention.
Figure 12:
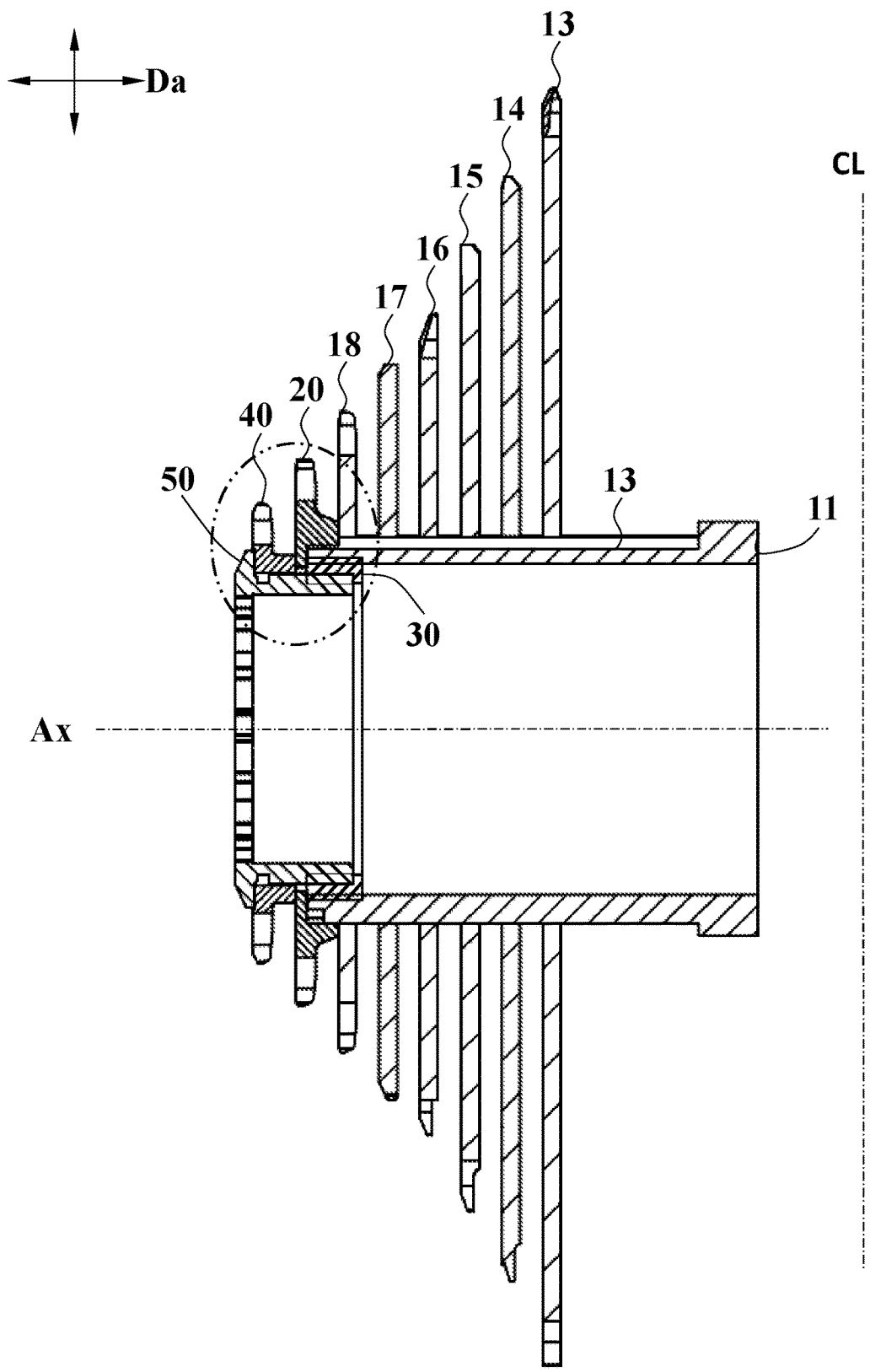
FIG. 12 is a cross sectional view of the bicycle cassette of the present invention.
Figure 13:
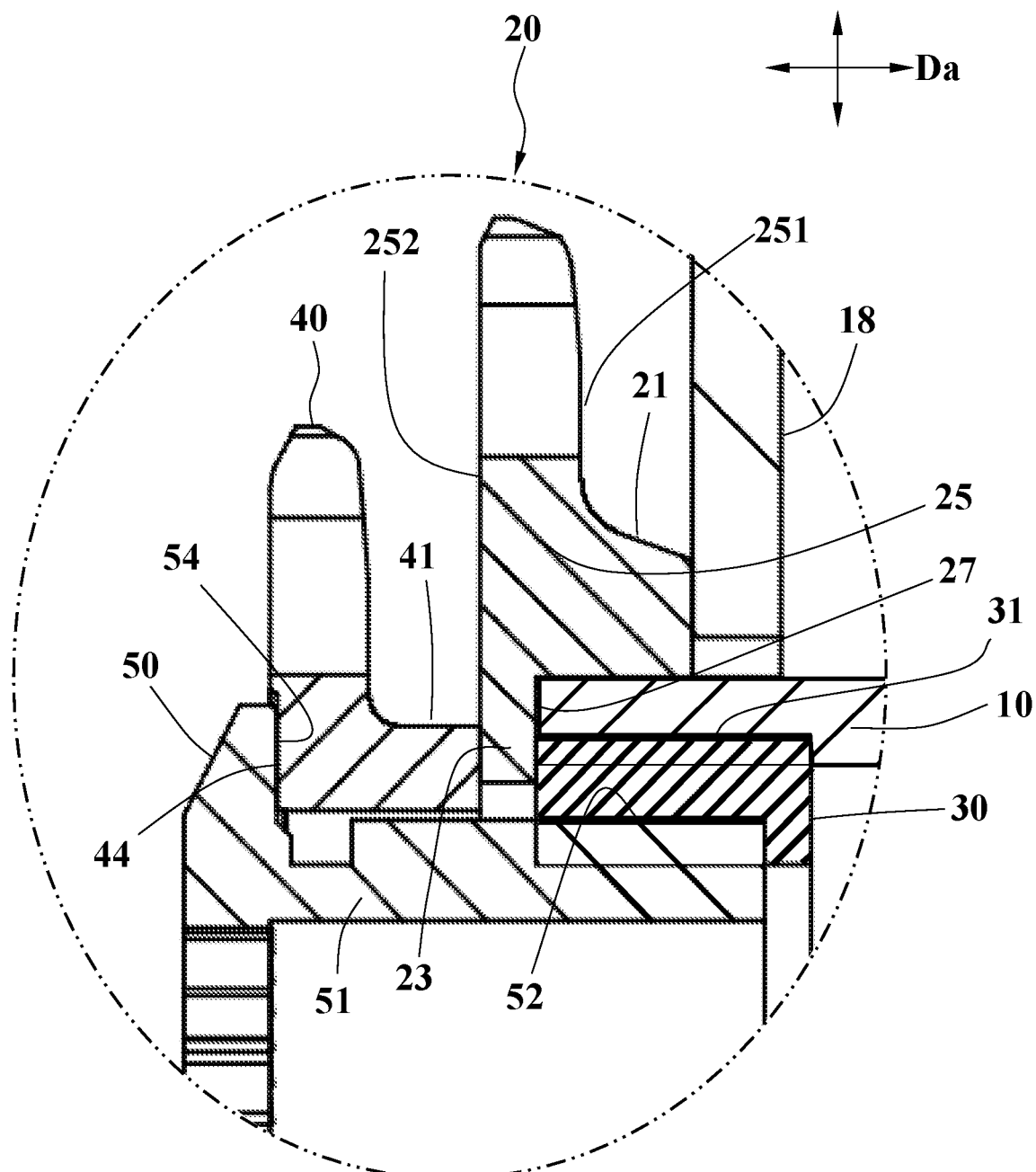
FIG. 13 is an enlarged view of the circled portion in FIG. 12.
Figure 14:
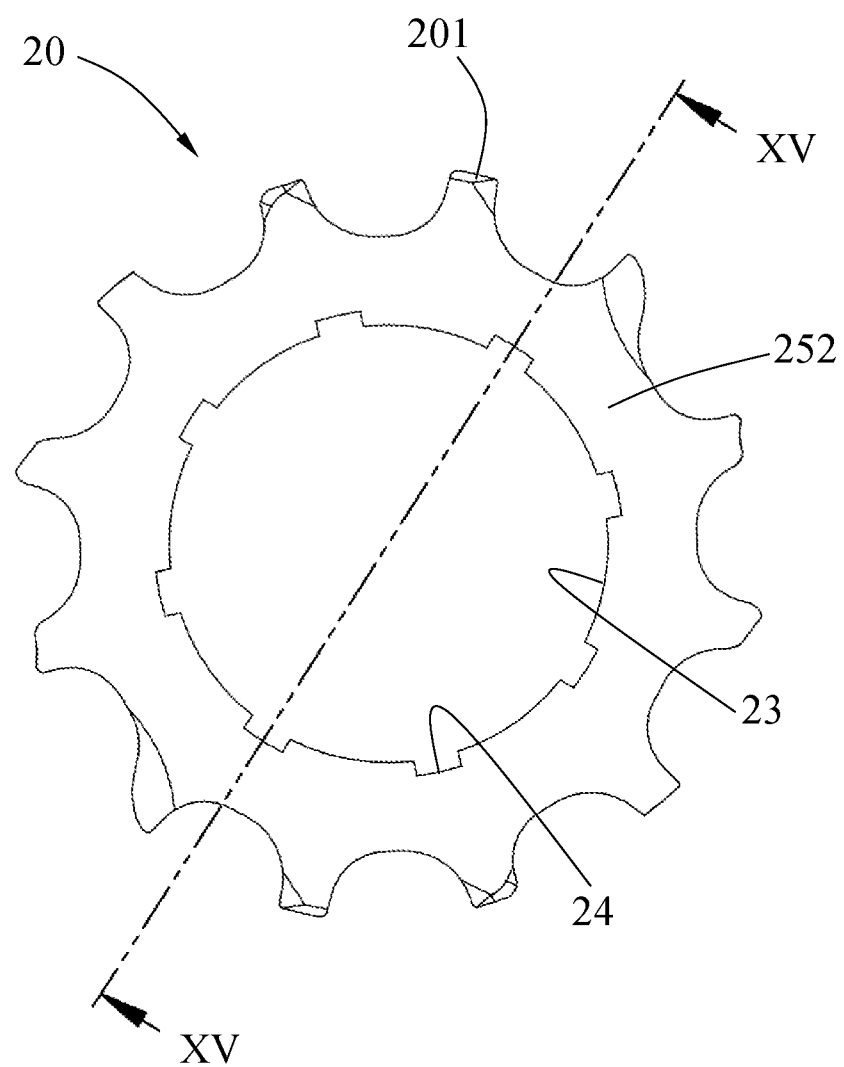
FIG. 14 is a front view of the first cog of the present invention.
Figure 15:
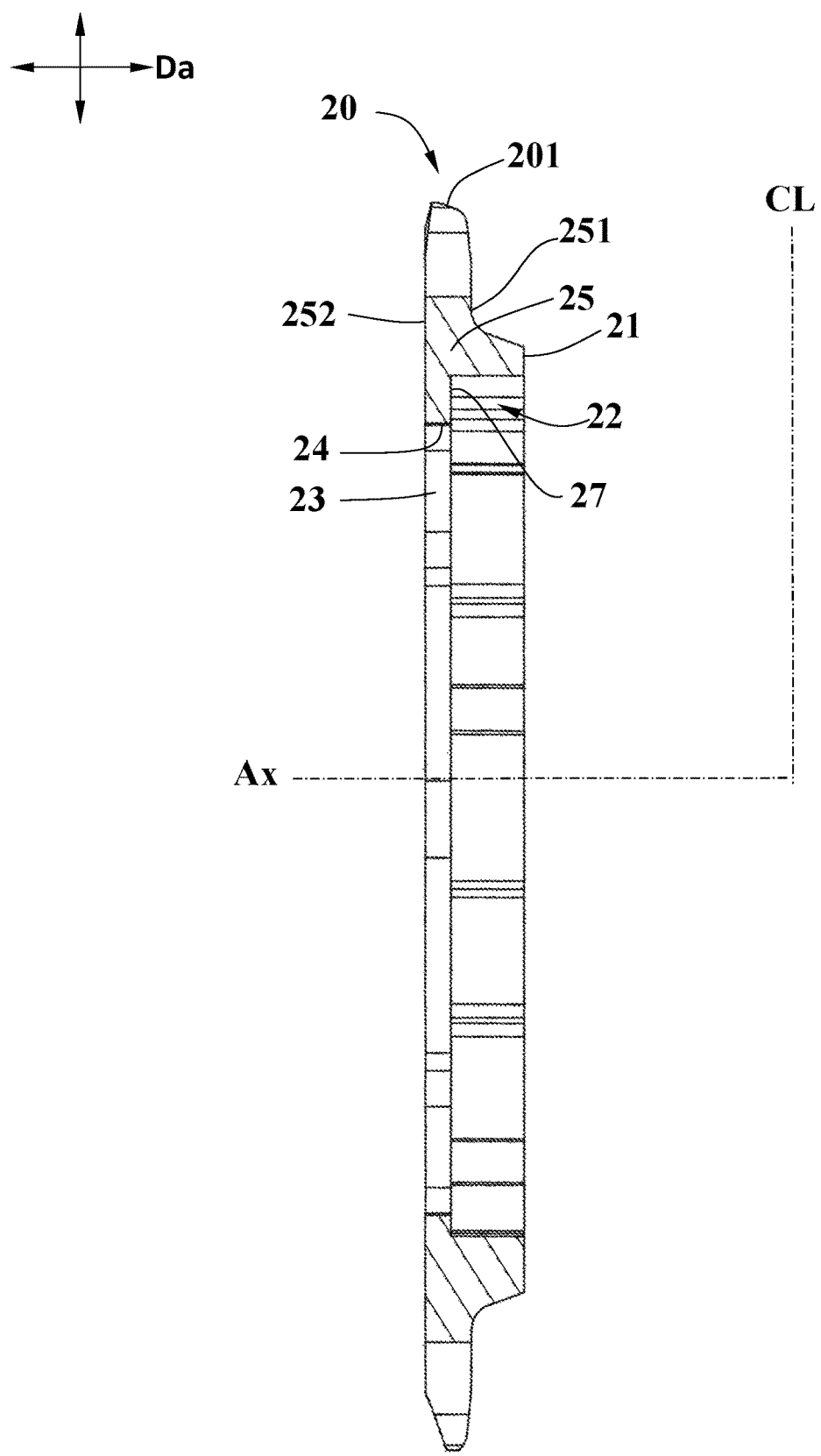
FIG. 15 is a cross sectional view, taken along line XV-XV in FIG. 14.

As shown in FIGS. 8 and 9, the additional cog 40 has at least one tooth less than the number of teeth of the first cog 20. Preferably, the additional cog 40 has 8 to 10 teeth. The additional cog 40 has an annular lip 41 extending axially from the rear end thereof, and multiple second protrusions 42 and multiple second recesses 43 are axially and alternatively formed in the annular lip 41. The second protrusions 42 of the additional cog 40 are engaged with the first recesses 24 of the first cog 20, and the first protrusions 23 of the first cog 20 are engaged with the second recesses 43 of the additional cog 40, such that the additional cog 40 is engaged with the first cog 20 and located outside of the second end 12 of the driver body 10. By the annular lip 41, the additional cog 40 is spaced from the first cog 20 properly to meet the needs for switching of the chain.

As shown in FIGS. 10 to 13, a cap 50 is a ring-shaped cap and has a tubular portion 51 extending axially from the rear end thereof. The tubular portion 51 extends through the additional cog 40 and includes a fourth threaded portion 52 defined in the outer periphery thereof. The fourth threaded portion 52 is located close to the distal end of the tubular portion 51. The fourth threaded portion 52 of the tubular portion 51 is threadedly connected to the third threaded portion 32 of the threaded ring 30. The cap 50 is located at one side of the additional cog 40 to position all of the cogs 13-18 to the driver body 10. The additional cog 40 includes a first anti-slip terrain 44 formed on one side thereof, and the cap 50 includes a second anti-slip terrain 54 formed on one side thereof. The first anti-slip terrain 44 and the second anti-slip terrain 54 are engaged with each other.

As shown in FIGS. 10 to 13, the present invention adds the additional cog 40 which has less than 11 teeth (preferably ten teeth) to the driver body 10 of the existing bicycle cassette to increase the tooth ratio to break through the limitation of tooth ratio of existing bicycle cassettes. The number of teeth of the additional cog 40 depends on the number of teeth of the first cog 20, preferably, one or two teeth less than the number of teeth of the first cog 20. In this embodiment the smallest cog of the cassette has 11 teeth, so that the additional cog 40 has 10 teeth.

Take the road bicycles with an eighteen-gear derailleur system as an example, the system includes a 50/34 T compact crankset. After the additional cog 40 is added, the tooth ratio is increased and the derailleur system becomes a twenty-gear derailleur system. The tooth ratio is illustrated as follows:

| | CASSETTE | | | | | | | | | |
|---|---|---|---|---|---|---|---|---|---|---|
| CHAINRING | 10 | 11 | 12 | 13 | 14 | 15 | 17 | 19 | 21 | 23 |
| 50 | 5 | 4.55 | 4.17 | 3.85 | 3.57 | 3.33 | 2.94 | 2.63 | 2.38 | 2.17 |
| 34 | 3.4 | 3.09 | 2.83 | 2.62 | 2.43 | 2.27 | 2.00 | 1.79 | 1.62 | 1.48 |

The technical characters are revealed to the first cog 20.

As shown in FIGS. 6 and 7, the first cog 20 includes multiple cog teeth 201, a sprocket 25, a flange 21, multiple engaging portions 22, multiple first protrusions 23 and multiple first recesses 24.

The total number of the multiple cog teeth 201 is eleven or more than eleven.

As shown in FIGS. 12 to 16, the sprocket 25 including an inside 251 that faces the axial center axis of rear hub CL, and an outside 252 located opposite to the inside 251 and located at the axial direction Da. The inside 251 of the sprocket 25 forms the flange 21 in the axial direction Da. The flange 21 forms the multiple engaging portions 22 facing the driver body 10. The outside 252 of the sprocket 25 forming the first protrusions 23 and the first recesses 24 in the axial direction Da. The axial length of the flange 21 in the axial direction Da is equal to the sprocket pitch P1 between the first cog 20 and the second cog 18. The sprocket pitch P1 between the first cog 20 and the second cog 18 meets the regulation.

The engaging portions 22 are connected to multiple keys 101 of the driver body 10.

Figure 16:
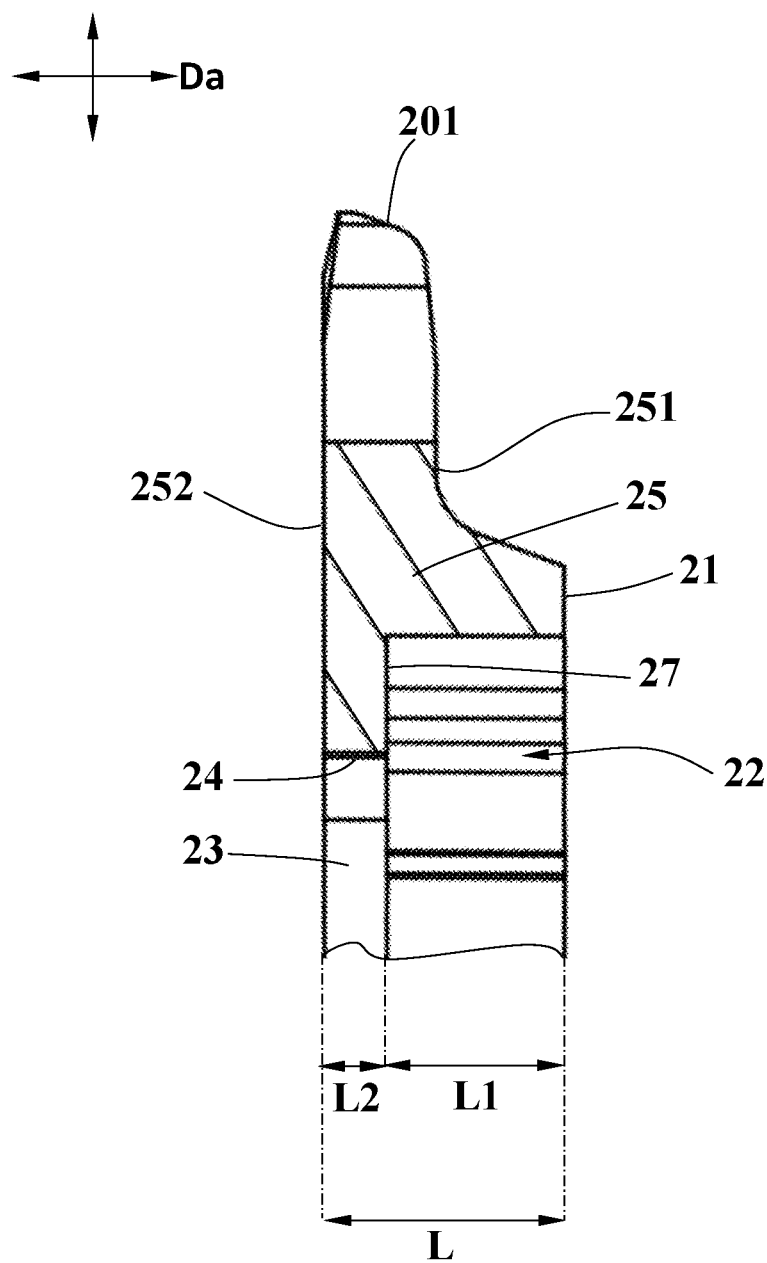
FIG. 16 is an enlarged view of a portion of the disclosure in FIG. 15.
Figure 17:
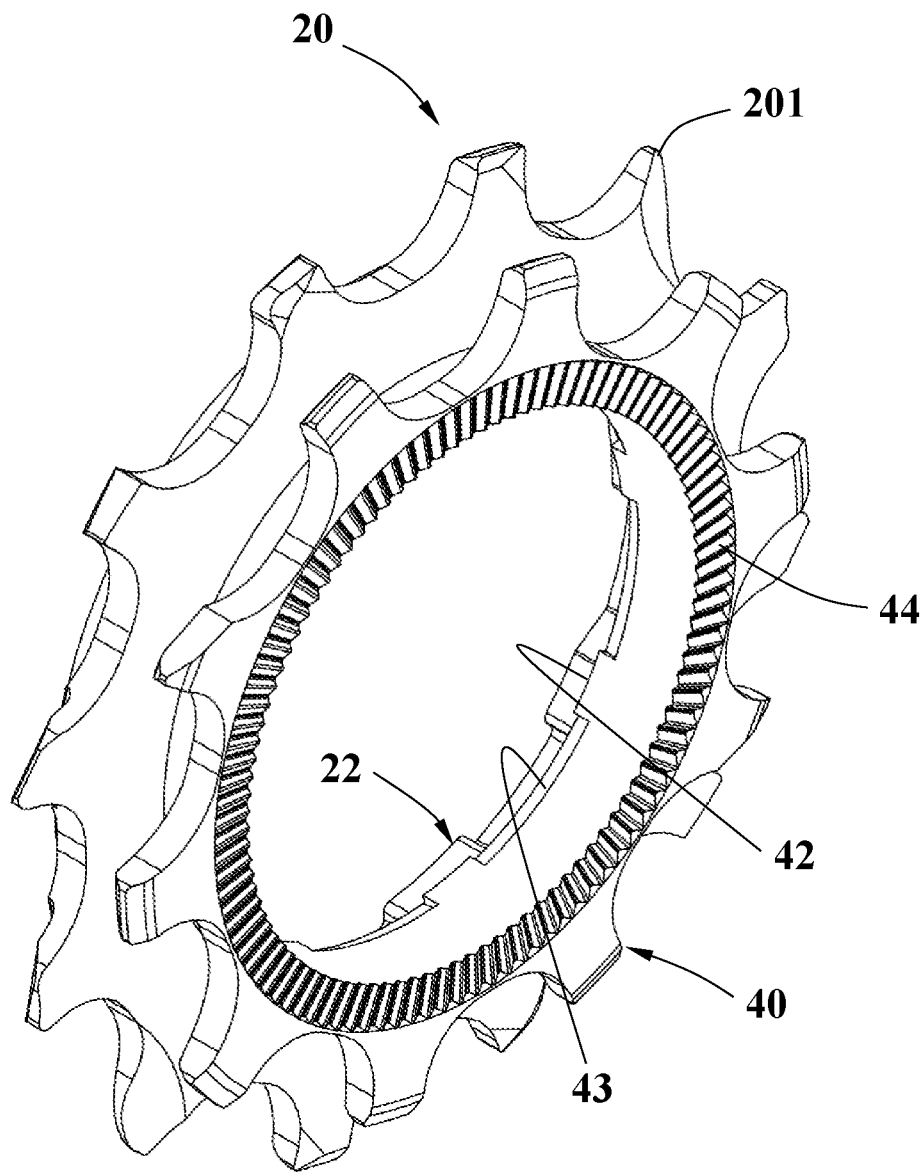
FIG. 17 is a front-end perspective view of the first cog and the additional cog.
Figure 18:
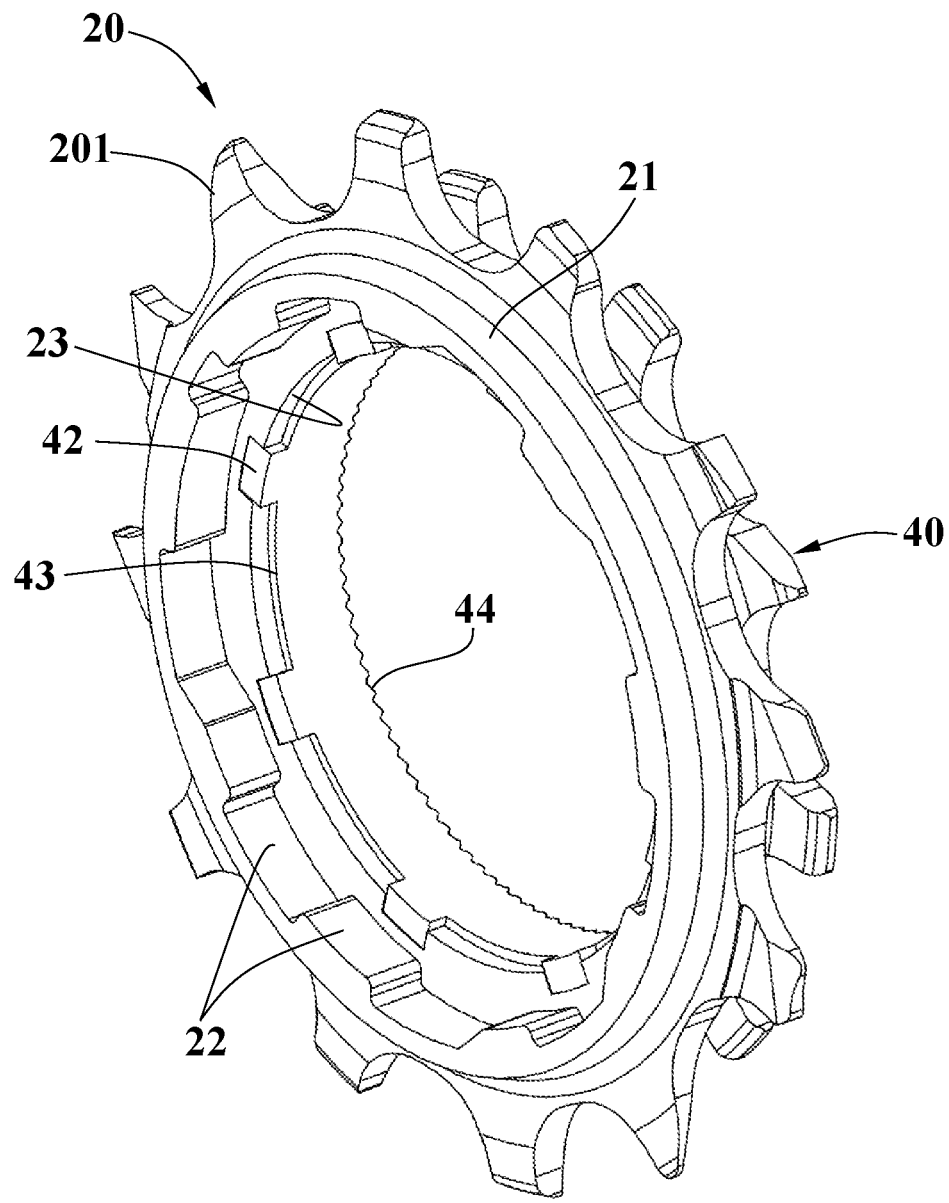
FIG. 18 is a rear-end perspective view of the first cog and the additional cog.
Figure 20:
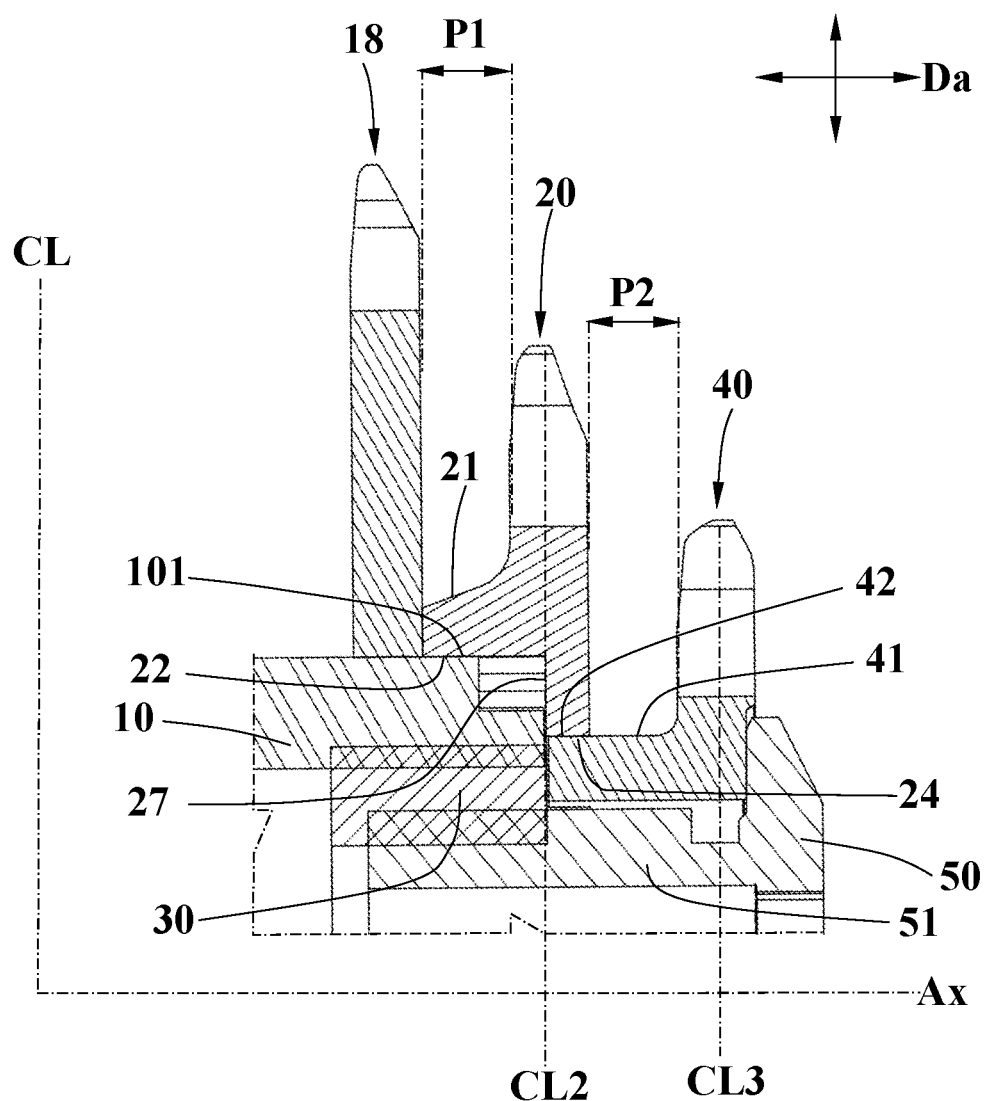
FIG. 20 is an enlarged view of a portion of the disclosure in FIG. 19.

As shown in FIGS. 16 and 20, the engaging portions 33 includes a first axial length L1 in the axial direction Da. The first axial length L1 is greater than the sprocket pitch P1. That is to say, when the first cog 20 is engaged with the driver body 10, the first axial length L1 of the multiple engaging portions 22 and the driver body 10 is greater than the sprocket pitch P1. Under the restriction of the sprocket pitch P1, the connection area between the first cog 20 and the driver body 10 is increased.

As shown in FIGS. 12 to 18, the first protrusions 12 and the first recesses 24 are engaged with the second recesses 43 and the second protrusions 42 of the additional cog 40. The first protrusions 23 and the first recesses 24 include a second axial length L2 in the axial direction Da. The second axial length L2 is equal to a difference of the axial length of sprocket L and the first axial length L1 in the axial direction Da. In other words, L2=L−L1, that is to say, L=L1+L2. The sum of the first axial length L1 and the second axial length L2 is equal to the axial length of sprocket L in the axial direction Da. That is to say, the axial length of sprocket L in the axial direction Da is fully used to the connection between the driver body 10 and the additional cog 40, and creates a maximum connection area.

Figure 19:
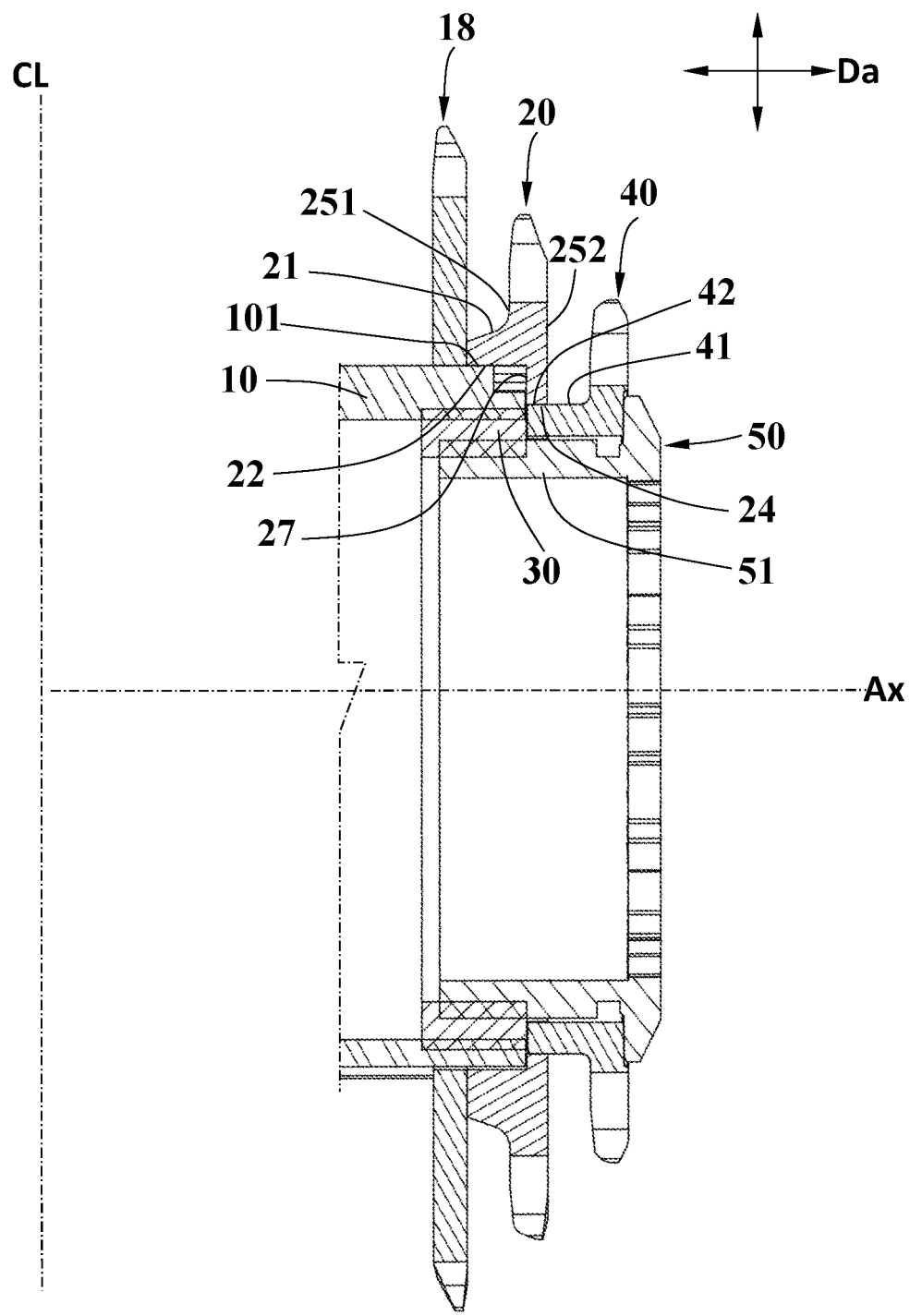
FIG. 19 is a cross sectional view to show the first cog, the additional cog, the cap and the driver body.

As shown in FIGS. 16, 19 and 20, the first cog 20 includes a contact face 27, and the contact face 27 is located at a conjunction area between the engaging portions 22 and the first recesses 24 and the first protrusions 23. The first cog 20 is engaged with the driver body 10 by the multiple engaging portions 22. The contact face 27 contacts the second end 12 of the driver body 10 so as to define that the center axis of first cog CL2 is perpendicular to the axis of sprocket assembly Ax. The first cog 20 is engaged with the driver body 10, and the flange 21 contacts the second cog 18. Therefore, the sprocket pitch P1 between the first cog 20 and the second cog 18 meets the regulation. The second recesses 43 and the second protrusions 42 of the additional cog 40 are engaged with the first protrusions 23 and the first recesses 24 of the first cog 20. The second protrusions 42 of the additional cog 40 contact the end face of the threaded ring 30. Therefore, the center axis of additional cog CL3 is perpendicular to the axis of sprocket assembly Ax, and the sprocket pitch P2 between the additional cog 40 and the first cog 20 meets the regulation.

While we have shown and described the embodiment in accordance with the present invention, it should be clear to those skilled in the art that further embodiments may be made without departing from the scope of the present invention.

What is claimed is:

1. A bicycle derailleur cassette with increased tooth ratio, comprising:

a driver body (10) connected to a rear hub of a bicycle, a plurality of cogs (13-18) sequentially mounted to the driver body (10) with equal spacing, the plurality of cogs (13-18) including a second cog (18), the driver body (10) having a first end (11) and a second end (12) opposite to the first end (11), the first end (11) of the driver body (10) connected to the rear hub, a first cog (20) mounted to the second end (12) of the driver body (10), a threaded ring (30) located in the second end (12) of the driver body (10), an additional cog (40) having at least one tooth less than a number of teeth of the first cog (20), the additional cog (40) having an annular lip (41) extending axially from a rear end thereof, multiple second protrusions (42) and multiple second recesses (43) axially and alternatively formed in the annular lip (41), a ring-shaped cap (50) having a tubular portion (51) extending axially therefrom, the tubular portion (51) extending through the additional cog (40) and fixed to the threaded ring (30), the ring-shaped cap (50) located at one side of the additional cog (40);

the first cog (20) including:

multiple cog teeth (201), a sprocket (25), a flange (21), multiple engaging portions (22), multiple first protrusions (23) and multiple first recesses (24);

a total number of the multiple cog teeth (201) being at least eleven:

the sprocket (25) including an inside (251) that faces the axial center axis of rear hub (CL), and an outside (252) located opposite to the inside (251), the inside (251) of the sprocket (25) forming the flange (21) in the axial direction, the flange (21) forming the multiple engaging portions (22) facing the driver body (10), the outside (252) of the sprocket (25) forming the first protrusions (23) and the first recesses (24) in the axial direction (Da);

an axial length of the flange (21) in the axial direction (Da) being equal to a sprocket pitch (P1) between the first cog (20) and the second cog (18);

the engaging portions (33) including a first axial length (L1) formed in the axial direction (Da), the first axial length (L1) being greater than the sprocket pitch (P1) between the first cog (20) and the second cog (18);

the first protrusions (23) and the first recesses (24) including a second axial length (L2) formed in the axial direction (Da), the second axial length (L2) being equal to a difference of the axial length of sprocket (L) and the first axial length (L1) in the axial direction (Da);

the first cog (20) including a contact face (27), the contact face (27) located at a conjunction area between the engaging portions (22) and the first recesses (24) and the first protrusions (23);

the engaging portions (22) connected to multiple keys (101) of the driver body (10), the contact face (27) contacting the second end (12) of the driver body (10), the flange (21) contacting the second sprocket (18), and the multiple first protrusions (23) and the first recesses (24) being engaged with the second recesses (43) and the second protrusions (42) of the additional cog (40), the second protrusions (42) of the additional cog (40) contacting an end face of the threaded ring (30).

* * * * *